(12) United States Patent
Yakoel et al.

(10) Patent No.: US 9,356,919 B1
(45) Date of Patent: May 31, 2016

(54) AUTOMATED DISCOVERY OF KNOWLEDGE-BASED AUTHENTICATION COMPONENTS

(71) Applicant: EMC Corporation, Hopkinton, MA (US)

(72) Inventors: Erez Yakoel, Kidron (IL); Lior Nudelman, Petach Tikva (IL); Boris Kronrod, Netanya (IL); Ram Reuveni, Katzrin (IL)

(73) Assignee: EMC Corporation, Hopkinton, MA (US)

( * ) Notice: Subject to any disclaimer, the term of this patent is extended or adjusted under 35 U.S.C. 154(b) by 310 days.

(21) Appl. No.: 13/927,559

(22) Filed: Jun. 26, 2013

(51) Int. Cl.
*G06F 7/04* (2006.01)
*G06F 15/16* (2006.01)
*G06F 17/30* (2006.01)
*H04L 29/06* (2006.01)

(52) U.S. Cl.
CPC .................................... *H04L 63/08* (2013.01)

(58) Field of Classification Search
CPC ..... G06F 21/31; H04L 9/3218; H04L 9/3271; H04L 63/08

USPC ............................ 726/2–7, 16–19, 21, 26–28
See application file for complete search history.

(56) References Cited

U.S. PATENT DOCUMENTS

| 6,070,243 | A  | * | 5/2000 | See et al. ........................... 726/2 |
| 2005/0097320 | A1 | * | 5/2005 | Golan et al. .................. 713/166 |
| 2007/0143625 | A1 | * | 6/2007 | Jung et al. ..................... 713/182 |
| 2009/0222907 | A1 | * | 9/2009 | Guichard ............ G06F 21/6227 726/17 |
| 2013/0247149 | A1 | * | 9/2013 | Sanft et al. ........................ 726/4 |

\* cited by examiner

*Primary Examiner* — Michael S McNally
*Assistant Examiner* — Trong Nguyen
(74) *Attorney, Agent, or Firm* — Ryan, Mason & Lewis, LLP

(57) ABSTRACT

Methods, apparatus and articles of manufacture for automated discovery of knowledge-based authentication components are provided herein. A method includes analyzing entity-related information to identify one or more individuals within the entity for exclusion from one or more authentication requirements in connection with one or more operations associated with the entity, wherein said analyzing is based on one or more pre-defined parameters, and querying an agent of the entity to approve each of the one or more individuals identified within the entity for exclusion from the one or more authentication requirements.

20 Claims, 4 Drawing Sheets

AUTOMATED DISCOVERY OF KNOWLEDGE-BASED AUTHENTICATION COMPONENTS

FIELD

The field relates generally to information technology (IT), and more particularly to knowledge-based authentication (KBA) systems.

BACKGROUND

A knowledge-based authentication (KBA) system can utilize, as input, a list of individuals (as identified, for example, via in a lightweight directory access protocol (LDAP) or other identifier) that should not be authenticated by the system. Such a list is also referred to herein as a white list. Commonly, individuals on a white list include individuals (executives, for example) for whom the corresponding entity is not willing to expose related information to a call center or analogous information hub. Entities may opt, alternatively, to utilize separate authentication techniques for such individuals.

However, existing KBA approaches require providing a full and complete white list manually, one entry at a time. Such approaches are labor intensive and vulnerable to inaccuracies due to data availability issues as well as changes and/or modifications made to relevant data.

Similarly, KBA systems can also utilize, as input, a list of subjects and/or keywords that should not be used as visible facts in a presentation to a user for generating authentication questions. Such a list is also referred to herein as a black list. Commonly, a black list is implemented and/or incorporated into a KBA so as to avoid asking authentication questions pertaining to potentially sensitive events, meetings, emails, etc.

However, existing KBA approaches, as with white lists, require providing a full and complete black list manually, one entry at a time. Such approaches are labor intensive because a black list may properly include many terms. Further, some terms may be sensitive in one context but less sensitive (or not at all sensitive) in other contexts, potentially leading to accuracy challenges for manual selection.

Accordingly, a need exists for techniques capable of automatically creating white lists and black lists to be used in connection with a KBA system.

SUMMARY

One or more illustrative embodiments of the present invention provide techniques for automated discovery of knowledge-based authentication components.

In accordance with an aspect of the invention, a method is provided comprising the steps of: analyzing entity-related information to identify one or more individuals within the entity for exclusion from one or more authentication requirements in connection with one or more operations associated with the entity, wherein said analyzing is based on one or more pre-defined parameters, and querying an agent of the entity to approve each of the one or more individuals identified within the entity for exclusion from the one or more authentication requirements.

Another aspect of the invention includes a method comprising the steps of: analyzing entity-related information to identify one or more terms for exclusion from use in a user query in connection with one or more authentication operations associated with the entity, and querying an agent of the entity to approve each of the one or more terms identified for exclusion from use in a user query in connection with one or more authentication operations associated with the entity.

The automated knowledge-based authentication component discovery techniques of the illustrative embodiments overcome one or more of the problems associated with the conventional techniques described previously, and provide accuracy and efficiency to existing KBA systems. These and other features and advantages of the present invention will become more readily apparent from the accompanying drawings and the following detailed description.

DETAILED DESCRIPTION

As will be described, the present invention, in one or more illustrative embodiments, provides techniques for automated discovery of knowledge-based authentication components. Specifically, aspects of the invention include automatically discovering and generating a white list (that is, an exclusion list of individuals) and/or a black list (that is, an exclusion list of query terms) for use in connection with a KBA system.

Illustrative embodiments of the present invention will be described herein with reference to exemplary communication systems and associated processing devices. It is to be appreciated, however, that the invention is not restricted to use with the particular illustrative system and device configurations shown. Accordingly, a communication system, as used herein, is intended to be broadly construed so as to encompass any type of system in which multiple processing devices and/or computing devices can communicate with one or more other devices.

Figure 1:
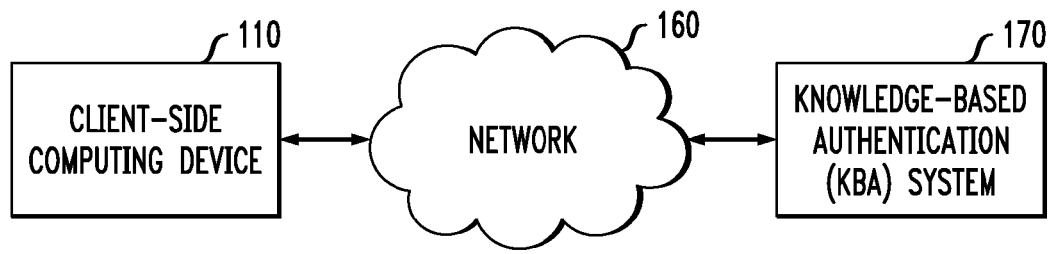
FIG. 1 is a diagram illustrating an example network environment in which one or more embodiments of the present invention can operate.

FIG. 1 illustrates an example client-side computing device (CSCD) 110 communicating with a knowledge-based authentication (KBA) system 170 over a network 160. The network 160 can include, for example, a global computer network such as the Internet, a wide area network (WAN), a local area network (LAN), a satellite network, a telephone or cable network, or various portions or combinations of these and other types of networks.

In at least one embodiment of the invention, the CSCD 110 is a user server which provides the KBA system 170 with data including, for example, partial or pre-existing white lists and/or or black lists, as well as data pertaining to an entity (structure, personnel, events, etc.). Also, the CSCD 110 may represent a portable device, such as a mobile telephone, personal digital assistant (PDA), wireless email device, etc. The CSCD 110 may alternatively represent a desktop or laptop personal computer (PC), a microcomputer, a workstation, a mainframe computer, or any other information processing device which can benefit from the use of automated KBA discovery techniques in accordance with the invention. It is to be appreciated that a given embodiment of the disclosed system may include multiple instances of CSCD 110 and possibly other system components, although only a single instance is shown in the simplified system diagram of FIG. 1 for clarity of illustration.

The CSCD 110 may also be referred to herein as simply a "user." The term "user," as used in this context, should be understood to encompass, by way of example and without limitation, a user device, a person or entity utilizing or otherwise associated with the device, or a combination of both. An operation described herein as being performed by a user may therefore, for example, be performed by a user device, a person or entity utilizing or otherwise associated with the device, or by a combination of both the person and the device. Similarly, information described as being associated with a user may, for example, be associated with a CSCD device 110, a person or entity utilizing or otherwise associated with the device, or a combination of both the person and the device.

An exemplary KBA system (such as system 170 in FIG. 1) is described in additional detail below in connection with FIG. 2.

Figure 2:
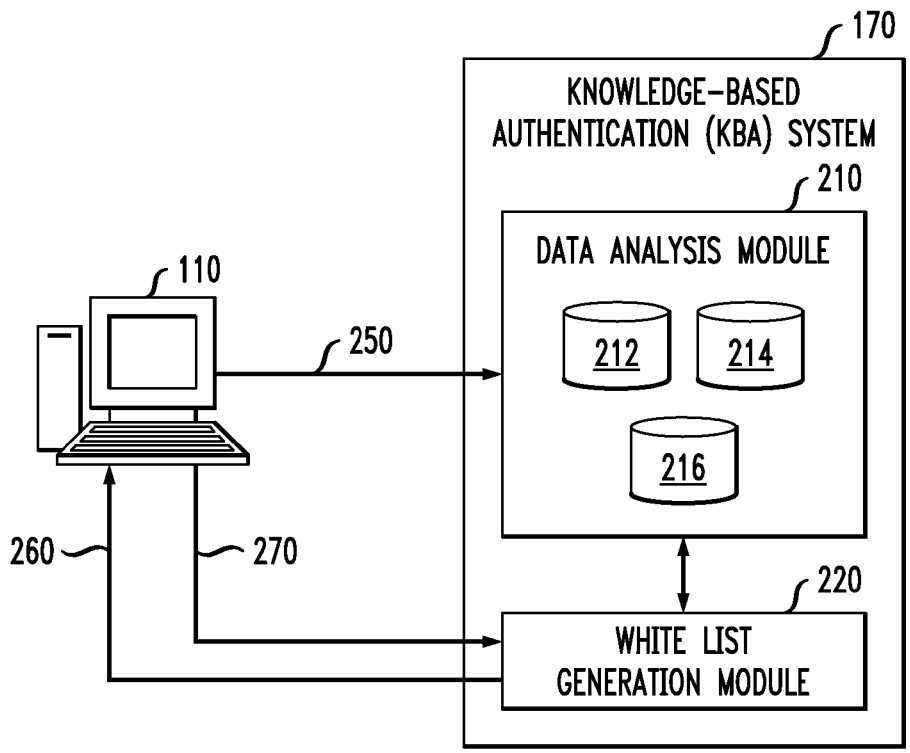
FIG. 2 is a block diagram illustrating example system components, according to an embodiment of the invention.

Accordingly, FIG. 2 is a block diagram illustrating example system components, according to an embodiment of the invention. By way of illustration, FIG. 2 depicts KBA system 170, as noted above, which receives input data provided by a user 110 (as well as additional feedback from the user) and outputs an automatically generated white list for subsequent use. In accordance with the example embodiment of the invention illustrated in FIG. 2 as well as FIG. 3, the user 110 can include a KBA administrator associated with an entity utilizing the KBA system 170.

As also depicted in FIG. 2, KBA system 170 includes a data analysis module 210 and a white list generation module 220. As described further herein, the data analysis module 210 can include, for example, an entity organizational structure database 212, an entity resources database 214, and an entity communication database 216. With respect to these databases, consider the following example. Assume that a customer is an enterprise or entity attempting to identify its employees via a KBA system such as system 170. Multiple alternatives may exist in such a scenario. For instance, the KBA can be provided with all necessary data on all of the customer's employees and will maintain all of the data in one or more of the above-noted databases. Alternatively, an online interface can be used each time items of data are provided per employee (or in other cases, end users such as an account owner of a bank). In this example, the full database will be owned by the customer, and the KBA system 170 will either need means to scan that database to identify the white list, or the KBA system 170 can check, on-the-fly per authentication, if an employee should (or should not) be included on the white list while specific items of data on the employee are obtained.

Accordingly, as illustrated in FIG. 2, at least one embodiment of the invention includes receiving input from the user 110 in step 250, wherein such input can include a basic, partial and/or pre-existing white list. Based on this input, the system 170 analyzes information maintained in the noted databases to determine zero or more individuals to be added to the white list. Additionally, at least one embodiment of the invention includes determining that a provided original white list contains one or more individuals that should be removed from the list. In such an embodiment, a mechanism can run periodically to add and/or remove individuals to/from the list upon artificial intelligence as well as, for example, feedback from a customer.

Analysis of the above-noted databases can include, by way of example, the following. With respect to the entity organizational structure database 212, the data analysis module 210 can parse job or position titles from a list of organizational titles (for example, via LDAP) stored in database 212, identify individuals associated with certain titles, and incorporate such individuals into the ultimately generated white list. In at least one embodiment of the invention, the list of titles can be pre-identified by the customer or as a pre-defined list in the system (or both). Additionally, the data analysis module 210 can analyze an organization tree of the given entity, stored in database 212, to determine which individuals report to whom, information which can supplement the position title determination noted above to more accurately identify the seniority of given individuals within the entity.

With respect to the entity resources database 214, the data analysis module 210 can analyze the allocation of physical resources to individuals within the entity. For example, parameters can be pre-defined to identify an individual assigned his or her own office (that is, an individual who does not have to share an office space with other individuals), an individual granted access to certain technological equipment and/or capabilities, etc. Such example parameters might associate an individual with access to such resources as sufficiently senior within the entity to warrant inclusion on the white list.

In addition, at least one embodiment of the invention can include the use of one or more heuristics. For example, upon approval of a list of individuals in the white list, at least one embodiment of the invention includes analyzing the data (title, place in hierarchy, resources, other meta data, etc.) associated with each individual, building a profile of each individual in the white list and identifying other individuals who have similar profiles, inferring that such individuals should be included in the white list as well. For instance, if it is determined that anyone having more than 100 people reporting to him or her is in the white list, at least one embodiment of the invention can include adding other individuals to the list who meet this criterion.

Additionally, the data analysis module 210 can analyze data stored in the entity resources database 214 derived from entity systems as an enterprise resource planning (ERP) system, benefits data, human resources (HR) data, compensation data, etc. Similarly, the data analysis module 210 can analyze such data in view of one or more pre-defined parameters to identify individuals warranting inclusion on the white list. Information sought in analyses such as the above can include, for example, salary, bonuses, benefits, shares, courses, car type (if owned by the company), room/office size, computing equipment assigned to the individual have, etc. Such data can facilitate an identification of which individual(s) should be included in the white list, as well as an identification of similar users.

With respect to the entity communication database 216, the data analysis module 210 can analyze communication data such as, for example, scheduled meetings between individuals within the entity, emails and phone calls from, to and/or between individuals within the entity, etc. Such analysis can be guided by one or more pre-defined parameters to identify individuals warranting inclusion on the white list. For instance, a parameter might attempt to identify an individual who communicates with (meets with, sends emails to, receives emails/phone calls from, etc.) a sufficiently senior individual within the entity so as to include him or her on the white list. At least one embodiment of the invention can include implementing a form of network analysis and/or back-coloring in connection with analyzing database 216.

Upon analyzing one or more of the above-noted databases, the data analysis module 210 compiles any identified individuals and provides the resulting list of individuals to the white list generation module 220, which generates a supplemental white list that includes the names of all of the identified individuals derived from the noted analyses that were not present on the initial white list provided by the user 110 (KBA administrator). Accordingly, at least one embodiment of the invention includes providing the supplemental white list to the user 110 in step 260 for user review. The user 110 can then provide feedback to the system 170 (via white list generation module 220) in step 270 based on the supplemental white list. For example, the user feedback can include indications of agreement or disagreement pertaining to the inclusion of each of the individuals identified in the supplemental white list. More generally, the system 170 can request feedback on individuals that were identified in the white list, and can request feedback on one or more individuals that were identified as not being included on the white list.

Additionally, based on the user feedback, the system 170 (via white list generation module 220) can modify and/or update one or more heuristics and/or weights applied during the analysis phase. By way merely of example, the feedback might indicate that analysis within the entity organizational structure database 212 be weighted more (that is, terms identified in this analysis be given stronger or more consideration for inclusion on the supplemental white list) than the entity resources database 214 or entity communication database 216 during the analysis and/or ultimate white list generation.

Consequently, subsequent to the processing of the user feedback, embodiments of the invention such as the example embodiment above can include generating an updated white list to be further used in connection with KBA techniques.

Also, at least one embodiment of the invention includes data analysis such as described above but without having previously received an initial white list from the user 110 (such as detailed in step 250 above). In such an example embodiment, the KBA system 170 (via data analysis module 210) carries out analysis of one or more databases as detailed above, and forward the results of the analysis to the white list generation module 220. The white list generation module 220, based on the received analysis results, generates an original white list and provides the white list to the user 110 as noted above via step 260. The user can then provide feedback to the system 170 (via white list generator module 220) based on the generated white list via step 270, and the white list generation module 220 can subsequently produce an updated white list in view of any feedback received from the user.

Additionally, at least one embodiment of the invention includes pre-building all relevant rules. Such a situation might include a rule such as, for example, that states if compensation is above x, or a job title is in the following list, or more than x people report to the individual, or he or she has an office which is bigger than m square feet, or any combination of the above, then that individual is to be included on the white list.

Figure 3:
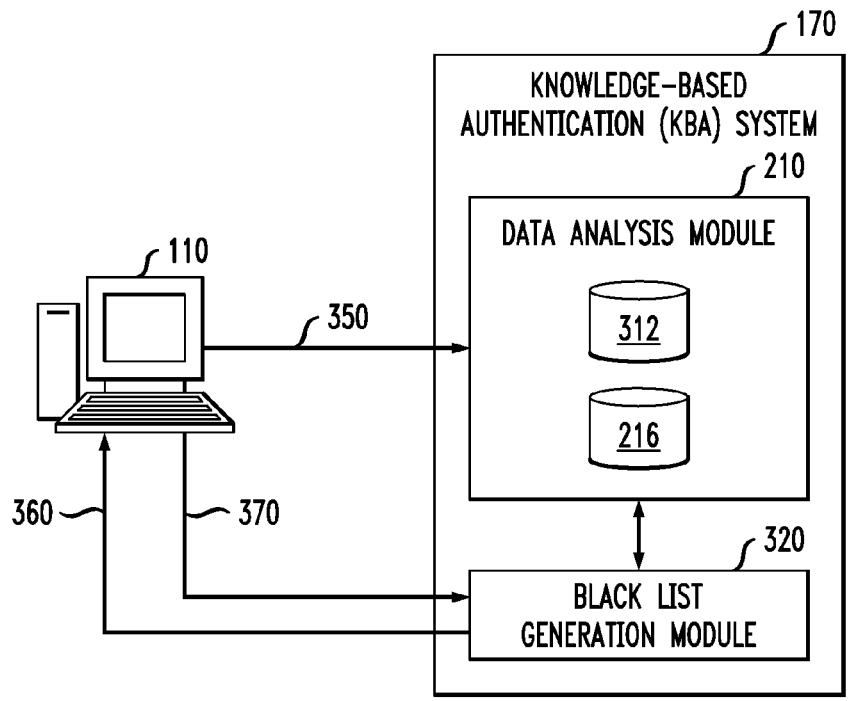
FIG. 3 is a diagram illustrating example system components, according to an embodiment of the invention.

FIG. 3 is a diagram illustrating example system components, according to an embodiment of the invention. By way of illustration, FIG. 3 depicts KBA system 170, as noted above, which receives input data provided by a user 110 (as well as additional feedback from the user) and outputs an automatically generated black list (or entries suggested for a black list) for subsequent use. In accordance with the illustrated example embodiment of the invention, the user 110 can include a KBA administrator associated with an entity utilizing the KBA system 170.

As also depicted in FIG. 3, KBA system 170 includes a data analysis module 210 and a black list generation module 320. As described further herein, the data analysis module 210 can include, for example, a dictionary database 312 and entity communication database 216. Accordingly, as illustrated in FIG. 3, at least one embodiment of the invention includes receiving input from the user 110 in step 350, wherein such input can include a base or initial black list of terms to be excluded from use in KBA authentication queries. Based on this input, the system 170 analyzes information maintained in the noted databases to determine zero or more terms to be added to the black list.

Analysis of the above-noted databases can include, by way of example, the following. With respect to the dictionary database 312, the data analysis module 210 can analyze the dictionary database 312 to determine one or more synonyms associated with each term included in the black list provided by the user 110 in step 350. Accordingly, the data analysis module 210 can provide any determined synonyms to the black list generation module 320 for inclusion in the updated black list of terms to be excluded from use in KBA authentication queries.

With respect to the entity communication database 216, the data analysis module 210 can analyze data pertaining to meetings scheduled and already-executed within the entity to determine potentially sensitive terms and/or keywords. By way of example, the data analysis module 210 can identify subjects and/or subject headings of meetings marked as private as potentially sensitive key-words. Additionally, for example, terms associated with meetings with no invited attendees can be identified as potentially sensitive. Further, subjects and/or subject headings of meetings and/or other communications (emails, instant messages, etc.) between individuals possessing certain job titles or positions of seniority within the entity can also be identified as potentially sensitive. Accordingly, in connection with these and other examples, the data analysis module 210 can analyze such data in view of one or more pre-defined parameters to identify terms and/or individuals associated with certain communications warranting specific analysis in connection with determining terms for exclusion (that is, terms for the black list).

In connection with the analyses of the noted databases, at least one embodiment of the invention includes analyzing each potentially sensitive term or keyword according to the context within which that term or keyword is found. For example, a scheduled meeting with a subject heading of "Doctor Appointment" will be analyzed differently with respect to the term "doctor" than an email between multiple individuals in the entity discussing a work by "Dr. Seuss."

Upon analyzing one or more of the above-noted databases, the data analysis module 210 compiles any identified terms and provides the resulting list of terms to the black list generation module 320, which generates a supplemental black list that includes all of the identified terms derived from the noted analyses that were not present on the initial black list provided by the user 110 (KBA administrator). Accordingly, at least one embodiment of the invention includes providing the supplemental black list to the user 110 in step 360 for user review. The user 110 can then provide feedback to the system 170 (via black list generation module 320) in step 370 based on the supplemental black list. For example, the user feedback can include indications of agreement or disagreement pertaining to the inclusion of each of the terms identified in the supplemental black list. As noted herein in connection with white lists, at least one embodiment of the invention can include requesting feedback on one or more key-words that were not identified as to be included on the black list.

Also, based on the user feedback, the system 170 (via black list generation module 320) can modify and/or update one or more heuristics and/or weights applied during analysis of the above-noted databases. By way of example, the feedback might indicate that analysis within the dictionary database 312 be weighted more (that is, terms identified in this analysis be given stronger or more consideration for inclusion on the supplemental black list) than the entity communication database 216 during the analysis and/or ultimate black list generation.

Accordingly, subsequent to the processing of the user feedback, at least one embodiment of the invention includes generating an updated black list (based on said user feedback) to be further used in connection with KBA techniques.

Additionally, at least one embodiment of the invention can also include analysis of databases such as described above but absent an initial black list from the user 110 (such as detailed in step 350 above). In such an example embodiment, the KBA system 170 (via data analysis module 210) carries out analysis of the entity communication database 216 as detailed above, and subsequently analyzes the dictionary database 312 to determine one or more synonyms associated with each term identified during the analysis of the entity communication database 216. The data analysis module 210 can, accordingly, forward the results of these analyses to the black list generation module 320 for generation of an original black list to be provided to the user 110 as noted above via step 360. The user can provide feedback to the system 170 (via black list generator module 320) based on the generated black list via step 370, and the black list generation module 320 can subsequently produce an updated black list in view of any feedback received from the user.

Additionally, at least one embodiment of the invention can include utilizing a black list baseline provided by a user and/or pre-defined in the system configurations.

Figure 4:
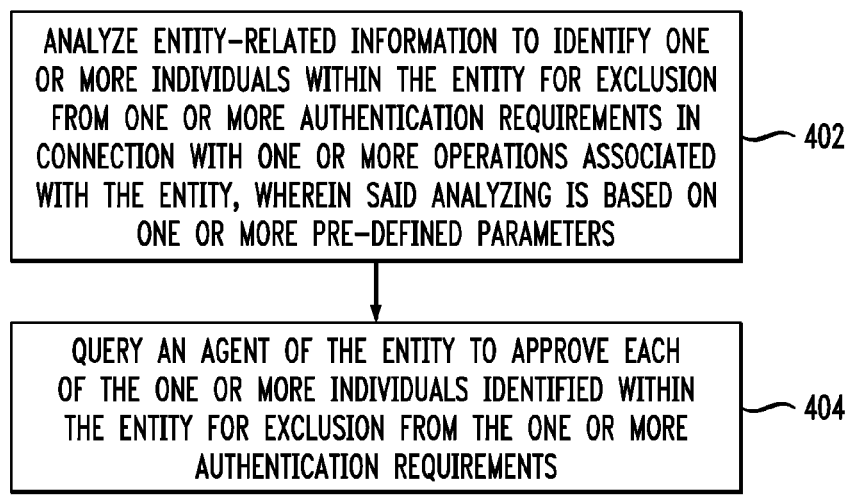
FIG. 4 is a flow diagram illustrating techniques according to an embodiment of the invention.

FIG. 4 is a flow diagram illustrating techniques according to an embodiment of the present invention. Step 402 includes analyzing entity-related information to identify one or more individuals within the entity for exclusion from one or more authentication requirements in connection with one or more operations associated with the entity, wherein said analyzing is based on one or more pre-defined parameters. As described herein, entity-related information can include, for example, organizational information pertaining to the entity, resource information pertaining to the entity, and/or communication information pertaining to the entity.

Additionally, the analyzing step can include identifying one or more individuals associated with one or more pre-defined position titles, as well as analyzing communication between individuals within the entity. Also, the analyzing step can include analyzing an allocation of one or more physical resources to individuals within the entity to identify one or more individuals granted access to one or more pre-defined physical resources.

Step 404 includes querying an agent of the entity to approve each of the one or more individuals identified within the entity for exclusion from the one or more authentication requirements.

The techniques depicted in FIG. 4 can additionally include receiving input from the agent, wherein said input includes one or more individuals within the entity pre-identified by the entity for exclusion from the authentication requirements in connection with one or more operations associated with the entity. In such an embodiment of the invention, the analyzing step can include analyzing entity-related information to identify one or more individuals for exclusion from the one or more authentication requirements not pre-identified by the entity.

Additionally, the techniques depicted in FIG. 4 can include obtaining feedback from the agent based on the individuals identified within the entity for exclusion from the one or more authentication requirements, and removing at least one individual from the individuals identified based on the feedback from the agent. Further, at least one embodiment of the invention includes applying a weighting scheme to one or more items of entity-related information based on the feedback from the agent.

Figure 5:
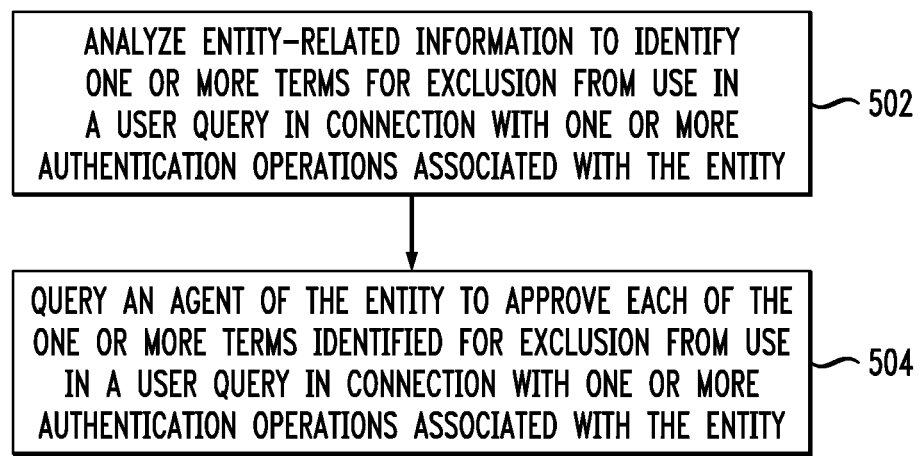
FIG. 5 is a flow diagram illustrating techniques according to an embodiment of the invention.

FIG. 5 is a flow diagram illustrating techniques according to an embodiment of the present invention. Step 502 includes analyzing entity-related information to identify one or more terms for exclusion from use in a user query in connection with one or more authentication operations associated with the entity. As detailed herein, the entity-related information can include communication information pertaining to the entity. Step 504 includes querying an agent of the entity to approve each of the one or more terms identified for exclusion from use in a user query in connection with one or more authentication operations associated with the entity.

The techniques depicted in FIG. 5 can additionally include analyzing one or more language sources to identify one or more synonyms for each of the terms identified for exclusion from use in a user query in connection with one or more authentication operations associated with the entity. Additionally, the techniques depicted in FIG. 5 can also include obtaining feedback from the agent based on the terms identified for exclusion from use in a user query in connection with one or more authentication operations associated with the entity, and modifying the terms identified for exclusion from use in a user query based on the feedback from the agent.

Automated KBA techniques of the type described herein may be implemented in a wide variety of different applications. One additional exemplary communication system application that may incorporate such techniques will now be described with reference to FIG. 6.

Figure 6:
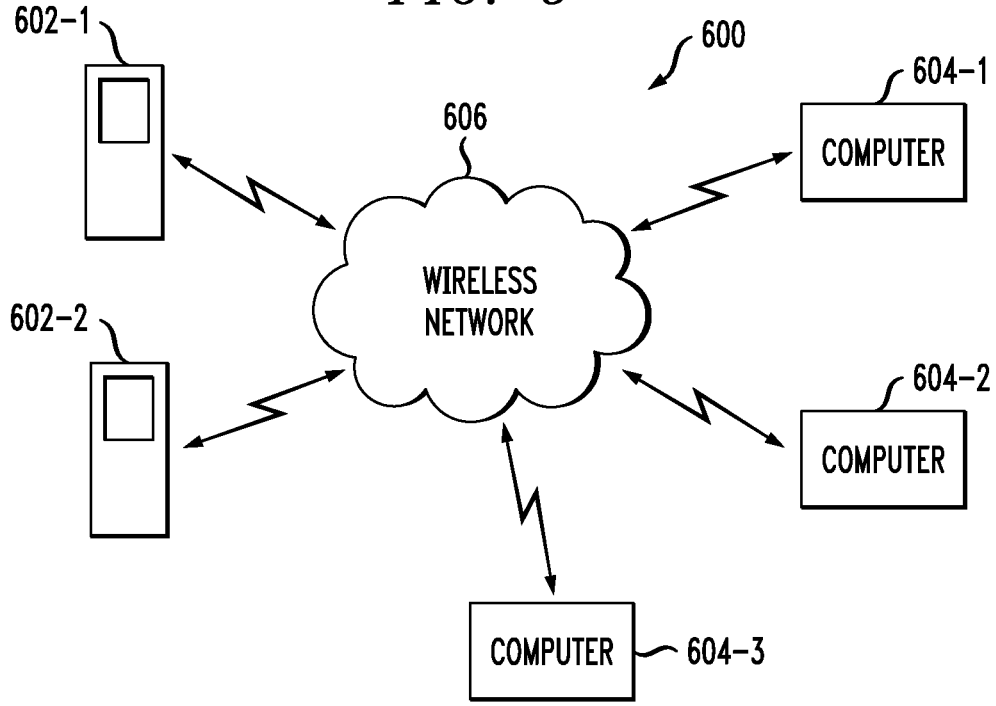
FIG. 6 shows an exemplary embodiment of a communication system that may incorporate the functionality of the type illustrated in at least one embodiment of the invention.

As depicted in FIG. 6, a communication system 600 comprises a plurality of mobile telephones 602-1 and 602-2 and computers 604-1, 604-2 and 604-3, configured to communicate with one another over a network 606. Any two or more of the devices 602 and 604 may correspond to communication or computing devices configured to implement at least one embodiment of the invention, as previously described. It is to be appreciated that the techniques disclosed herein can be implemented in numerous other applications.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

By way of example, an aspect of the present invention can make use of software running on a general purpose computer.

Figure 7:
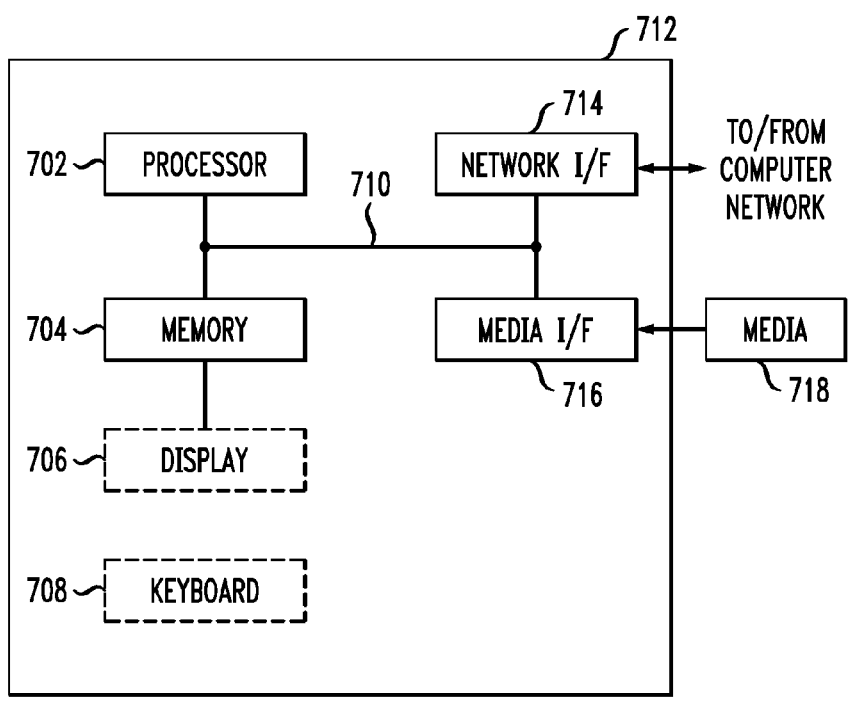
FIG. 7 is a system diagram of an exemplary computer system on which at least one embodiment of the invention can be implemented.

For example, FIG. 7 is a system diagram of an exemplary computer system on which at least one embodiment of the invention can be implemented. As depicted in FIG. 7, an example implementation employs, for example, a processor 702, a memory 704, and an input/output interface formed, for example, by a display 706 and a keyboard 708. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 702, memory 704, and input/output interface such as display 706 and keyboard 708 can be interconnected, for example, via bus 710 as part of a data processing unit 712. Suitable interconnections via bus 710, can also be provided to a network interface 714 (such as a network card), which can be provided to interface with a computer network, and to a media interface 716 (such as a diskette or compact disc read-only memory (CD-ROM) drive), which can be provided to interface with media 718.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 708, displays 706, and pointing devices, can be coupled to the system either directly (such as via bus 710) or through intervening I/O controllers.

Network adapters such as network interface 714 (for example, a modem, a cable modem or an Ethernet card) can also be coupled to the system to enable the data processing system to become coupled to other data processing systems or remote printers or storage devices through intervening private or public networks.

As used herein, a server includes a physical data processing system (such as system 712 as depicted in FIG. 7) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electro-magnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a users computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems and computing devices that can benefit from automated KBA discovery techniques. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
analyzing weighted entity-related information to identify one or more individuals within the entity for exclusion from one or more authentication requirements in connection with one or more operations associated with the entity,
wherein said weighted entity-related information comprises at least (i) organizational information pertaining to the entity comprising a set of multiple position titles and individuals associated therewith within the entity, (ii) resource information pertaining to the entity comprising an allocation of resources to individuals within the entity, and (iii) communication information within the entity comprising communication events between individuals within the entity, and
wherein said analyzing is based on a distinct weight applied to each item of (i) the organizational information, (ii) the resource information, and (iii) the communication information, wherein a higher weight attributed to a first item of information indicates that additional consideration is to be given for exclusion of the individual associated with the first item of information than is to be given for an individual associated with a second item of information with a lesser weight attributed thereto;
querying an agent of the entity to approve each of the one or more individuals identified within the entity for exclusion from the one or more authentication requirements; and
generating a list of one or more individuals within the entity for exclusion from the one or more authentication requirements based on (i) said analyzing and (ii) said querying;
wherein said analyzing, said querying and said generating are carried out by at least one computing device.

2. The method of claim 1, further comprising:
receiving input from the agent, wherein said input comprises one or more individuals within the entity pre-identified by the entity for exclusion from the one or more authentication requirements in connection with one or more operations associated with the entity.

3. The method of claim 2, wherein said analyzing comprises analyzing the weighted entity-related information to identify one or more individuals for exclusion from the one or more authentication requirements not pre-identified by the entity.

4. The method of claim 1, wherein said analyzing comprises analyzing the allocation of resources to individuals within the entity to identify one or more individuals granted access to one or more pre-defined resources.

5. The method of claim 1, further comprising:
obtaining feedback from the agent based on the one or more individuals identified within the entity for exclusion from the one or more authentication requirements.

6. The method of claim 5, further comprising:
removing at least one individual from the one or more individuals identified within the entity for exclusion from the one or more authentication requirements based on the feedback from the agent.

7. The method of claim 5, further comprising:
updating the distinct weight applied to each item of (i) the organizational information, (ii) the resource information, and (iii) the communication information based on the feedback from the agent.

8. The method of claim 1, wherein said analyzing comprises identifying each of the individuals associated with a pre-defined sub-set of the multiple position titles for exclusion from the one or more authentication requirements.

9. An article of manufacture comprising a non-transitory processor-readable storage medium having processor-readable instructions tangibly embodied thereon which, when implemented, cause a processor to carry out steps comprising:
analyzing weighted entity-related information to identify one or more individuals within the entity for exclusion from one or more authentication requirements in connection with one or more operations associated with the entity,
wherein said weighted entity-related information comprises at least (i) organizational information pertaining to the entity comprising a set of multiple position titles and individuals associated therewith within the entity, (ii) resource information pertaining to the entity comprising an allocation of resources to individuals within the entity, and (iii) communication information within the entity comprising communication events between individuals within the entity, and
wherein said analyzing is based on a distinct weight applied to each item of (i) the organizational information, (ii) the resource information, and (iii) the communication information, wherein a higher weight attributed to a first item of information indicates that additional consideration is to be given for exclusion of the individual associated with the first item of information than is to be given for an individual associated with a second item of information with a lesser weight attributed thereto;
querying an agent of the entity to approve each of the one or more individuals identified within the entity for exclusion from the one or more authentication requirements; and
generating a list of one or more individuals within the entity for exclusion from the one or more authentication requirements based on (i) said analyzing and (ii) said querying.

10. The article of manufacture of claim 9, wherein said analyzing comprises analyzing the allocation of resources to individuals within the entity to identify one or more individuals granted access to one or more pre-defined resources.

11. The article of manufacture of claim 9, wherein said analyzing comprises identifying each of the individuals associated with a pre-defined sub-set of the multiple position titles for exclusion from the one or more authentication requirements.

12. An apparatus comprising:
a memory; and
at least one processor coupled to the memory and configured to:
analyze weighted entity-related information to identify one or more individuals within the entity for exclusion from one or more authentication requirements in connection with one or more operations associated with the entity,
wherein said weighted entity-related information comprises at least (i) organizational information pertaining to the entity comprising a set of multiple position titles and individuals associated therewith within the entity, (ii) resource information pertaining to the entity comprising an allocation of resources to individuals within the entity, and (iii) communication information within the entity comprising communication events between individuals within the entity, and
wherein said analyzing is based on a distinct weight applied to each item of (i) the organizational information, (ii) the resource information, and (iii) the communication information, wherein a higher weight attributed to a first item of information indicates that additional consideration is to be given for exclusion of the individual associated with the first item of information than is to be given for an individual associated with a second item of information with a lesser weight attributed thereto;
query an agent of the entity to approve each of the one or more individuals identified within the entity for exclusion from the one or more authentication requirements; and
generate a list of one or more individuals within the entity for exclusion from the one or more authentication requirements based on (i) said analyzing and (ii) said querying.

13. A method comprising:
analyzing weighted entity-related information to identify one or more terms for exclusion from use in a user query in connection with one or more authentication operations associated with the entity,
wherein said weighted entity-related information comprises multiple types of communication information within the entity, and
wherein said analyzing is based on a distinct weight applied to each of the multiple types of communication information within the entity, wherein a higher weight attributed to a first type of communication information indicates that additional consideration is to be given for exclusion of a term associated with the first type of communication information than is to be given for a term associated with a second type of communication information with a lesser weight attributed thereto;
analyzing one or more language sources to identify one or more synonyms for each of the one or more terms identified for exclusion;
querying an agent of the entity to approve each of the one or more terms identified for exclusion from use in a user query in connection with one or more authentication operations associated with the entity; and
generating a list of one or more terms for exclusion from use in a user query in connection with the one or more authentication operations based on (i) said analyzing steps and (ii) said querying step;
wherein said analyzing entity-related information, said analyzing one or more language sources, said querying and said generating are carried out by at least one computing device.

14. The method of claim 13, further comprising:
obtaining feedback from the agent based on the one or more terms identified for exclusion from use in a user query in connection with one or more authentication operations associated with the entity.

15. The method of claim 14, further comprising:

modifying the one or more terms identified for exclusion from use in a user query in connection with one or more authentication operations associated with the entity based on the feedback from the agent.

16. The method of claim 14, further comprising:

updating the distinct weight applied to each of the multiple types of communication information based on the feedback from the agent.

17. An article of manufacture comprising a non-transitory processor-readable storage medium having processor-readable instructions tangibly embodied thereon which, when implemented, cause a processor to carry out steps comprising:

analyzing weighted entity-related information to identify one or more terms for exclusion from use in a user query in connection with one or more authentication operations associated with the entity, wherein said weighted entity-related information comprises multiple types of communication information within the entity, and wherein said analyzing is based on a distinct weight applied to each of the multiple types of communication information within the entity, wherein a higher weight attributed to a first type of communication information indicates that additional consideration is to be given for exclusion of a term associated with the first type of communication information than is to be given for a term associated with a second type of communication information with a lesser weight attributed thereto;

analyzing one or more language sources to identify one or more synonyms for each of the one or more terms identified for exclusion;

querying an agent of the entity to approve each of the one or more terms identified for exclusion from use in a user query in connection with one or more authentication operations associated with the entity; and generating a list of one or more terms for exclusion from use in a user query in connection with the one or more authentication operations based on (i) said analyzing steps and (ii) said querying step.

18. The article of manufacture of claim 17, further comprising:

obtaining feedback from the agent based on the one or more terms identified for exclusion from use in a user query in connection with one or more authentication operations associated with the entity.

19. The article of manufacture of claim 18, further comprising:

modifying the one or more terms identified for exclusion from use in a user query in connection with one or more authentication operations associated with the entity based on the feedback from the agent.

20. An apparatus comprising:

a memory; and at least one processor coupled to the memory and configured to:

analyze weighted entity-related information to identify one or more terms for exclusion from use in a user query in connection with one or more authentication operations associated with the entity, wherein said weighted entity-related information comprises multiple types of communication information within the entity, and wherein said analyzing is based on a distinct weight applied to each of the multiple types of communication information within the entity, wherein a higher weight attributed to a first type of communication information indicates that additional consideration is to be given for exclusion of a term associated with the first type of communication information than is to be given for a term associated with a second type of communication information with a lesser weight attributed thereto;

analyze one or more language sources to identify one or more synonyms for each of the one or more terms identified for exclusion;

query an agent of the entity to approve each of the one or more terms identified for exclusion from use in a user query in connection with one or more authentication operations associated with the entity; and generate a list of one or more terms for exclusion from use in a user query in connection with the one or more authentication operations based on (i) said analyzing steps and (ii) said querying step.

* * * * *